US012776185B2

(12) United States Patent
Upadrasta et al.

(10) Patent No.: US 12,776,185 B2
(45) Date of Patent: Oct. 27, 2026

(54) SYSTEMS AND METHODS FOR USE OF CRYPTOCURRENCIES IN A CASINO GAMING SYSTEM

(71) Applicant: LNW Gaming, Inc., Las Vegas, NV (US)

(72) Inventors: Sravan Upadrasta, Calgary (CA); Vishnuvikas Krishnamurthy, St. Albert (CA); Muthukumaran Palanichamy, St. Albert (CA); Karthikeyan Elangovan, St. Albert (CA); Muthu Krishnan Selvamani, Chennai (IN); Venkatakrishnan Ramabadran, Chennai (IN); Raghunathan Pari, Kannamangalam (IN); Nandakumar Manohar, Sivagangai (IN); Harikumar Thiagarajan, Chennai (IN); Balan Sandeep, Kerala (IN); Shanmuga Sundaram Ananth, Ariyalur (IN); Kalimuthu Ariram, Pin (IN); Sundar Nayak Satya, Bhubaneswar (IN); Mohana Priya Mohan, Chennai (IN); Basha Mohamadrafy, Chennai (IN); Nallarasu Banupriya, Salem (IN)

(73) Assignee: LNW Gaming, Inc., Las Vegas, NV (US)

( * ) Notice: Subject to any disclaimer, the term of this patent is extended or adjusted under 35 U.S.C. 154(b) by 599 days.

(21) Appl. No.: 18/337,604

(22) Filed: Jun. 20, 2023

(65) Prior Publication Data

US 2024/0021046 A1 Jan. 18, 2024

Related U.S. Application Data

(60) Provisional application No. 63/388,350, filed on Jul. 12, 2022.

(51) Int. Cl.

*G07F 17/32* (2006.01)
*G06Q 20/06* (2012.01)

(Continued)

(52) U.S. Cl.

CPC ....... *G07F 17/3225* (2013.01); *G06Q 20/065* (2013.01); *G06Q 20/10* (2013.01);

(Continued)

(58) Field of Classification Search

CPC ............ G07F 17/3225; G07F 17/3255; G07F 17/3241; G07F 17/3244; G06Q 20/065;

(Continued)

(56) References Cited

U.S. PATENT DOCUMENTS

2020/0152005 A1* 5/2020 Higgins .............. G07F 17/3227
2021/0144149 A1 5/2021 Simons (Continued)

FOREIGN PATENT DOCUMENTS

WO 2021075080 A1 4/2021
WO 2021099802 A1 5/2021
WO 2022016020 A1 1/2022

*Primary Examiner* — Pierre E Elisca

(57) ABSTRACT

Disclosed are various embodiments directed towards devices, systems, and methods involving the use of cryptocurrency in player tracking and reward systems. A player may deposit cryptocurrency into a player account for the purpose of funding casino play. The player may also withdraw funds from the player account in the form of cryptocurrency. The player may also redeem player loyalty points for cryptocurrency accepted by various merchants. The casino's cryptocurrency may be a wrapped version of a public cryptocurrency and may mimic a public stablecoin. The cryptocurrency held by the casino may be maintained on an enterprise blockchain or in a distributed ledger system in which multiple casinos participate to provide an efficient (Continued)

common private cryptocurrency in any of the participating casinos with a minimal cost per transaction.

16 Claims, 23 Drawing Sheets

(51) Int. Cl.
*G06Q 20/10* (2012.01)
*G06Q 20/36* (2012.01)

(52) U.S. Cl.
CPC ..... *G06Q 20/3678* (2013.01); *G07F 17/3255* (2013.01); *G06Q 2220/00* (2013.01)

(58) Field of Classification Search
CPC ............... G06Q 20/10; G06Q 20/3678; G06Q 2220/00; G06Q 20/102; G06Q 20/36; G06Q 20/381; G06Q 30/0207; G06Q 30/0209; G06Q 30/0226; G06Q 30/0233
USPC .......................................................... 463/25
See application file for complete search history.

(56) References Cited

U.S. PATENT DOCUMENTS

| | | | | |
|---|---|---|---|---|
| 2022/0141231 | A1 | 5/2022 | Simons | |
| 2022/0327529 | A1 | 10/2022 | Williams | |
| 2022/0337424 | A1 | 10/2022 | Fournier et al. | |
| 2022/0374874 | A1* | 11/2022 | Irwin, Jr. | G06Q 20/02 |
| 2023/0050782 | A1 | 2/2023 | Pacifico et al. | |
| 2023/0064949 | A1* | 3/2023 | Higgins | G07F 17/3258 |
| 2023/0075884 | A1 | 3/2023 | Jakobsson et al. | |
| 2023/0186284 | A1* | 6/2023 | Irwin, Jr. | G06Q 20/02 705/69 |
| 2024/0021046 | A1* | 1/2024 | Upadrasta | G06Q 20/065 |
| 2024/0038022 | A1* | 2/2024 | Sulzbacher | G07F 17/3244 |
| 2024/0412592 | A1* | 12/2024 | Higgins | G06Q 20/02 |

* cited by examiner

CREATE TRANSFER WALLET

WITHDRAW CRYPTOCURRENCY

REDEEM LOYALTY POINTS

FIG. 11
12:11 AM
CASINO 6601
YOUR CLUB LEVEL
parx casino
Please login to play
Welcome
LOGIN/SIGN UP
PLAYER
GAMING
ENTERTAIN
DINING
MORE

FIG. 12
CASINO 6601
Qualified
CONNECT
parx casino
Arvilla
503853
CRYPTO
LINK WALLET
WITHDRAW CRYPTO
WALLET
WALLET
UWC EXCHANG
PLAYER
GAMING
ENTERTAIN
DINING
MORE

FIG. 16
Deposit Crypto
BITCOIN
ETHEREUM
DOGE COIN
POLYGON MATIC
UNIFIED WOLF COIN
$1 = 0.00002632 BTC
By Checking this box, you agree to withdraw amount from your Unified Wallet Account
DEPOSIT

FIG. 18
Withdraw Crypto
BITCOIN
ETHEREUM
DOGE COIN
POLYGON MATIC
UNIFIED WOLF COIN
$1 = 0.00002632 BTC
By Checking this box, you agree to deposit amount to your Unified Wallet Account
WITHDRAW

SYSTEMS AND METHODS FOR USE OF CRYPTOCURRENCIES IN A CASINO GAMING SYSTEM

RELATED APPLICATIONS

This patent application claims priority benefit to U.S. Provisional Patent Application No. 63/388,350 filed Jul. 12, 2022. The 63/388,350 Application is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022-2023, LNW Gaming, Inc.

FIELD OF THE INVENTION

The present invention relates generally with gaming devices and gaming systems that use cryptocurrency and related methods.

BACKGROUND OF THE INVENTION

Various uses of cryptocurrencies are becoming well known; however, current casino gaming machines and systems do not provide for the uses of cryptocurrencies described herein.

SUMMARY OF THE INVENTION

Briefly and in general terms, various embodiments are directed towards devices, systems, and methods involving the use of cryptocurrency in player tracking and reward systems. Disclosed are methods of operating a casino gaming system to establish a play session for a player. The player may deposit cryptocurrency into a player account for the purpose of funding casino play. The player may also withdraw funds from the player account in the form of cryptocurrency. In some embodiments, the player may also redeem player loyalty points for cryptocurrency accepted by various merchants. In still other embodiments, the cryptocurrency held by the casino may be maintained on an enterprise blockchain. In some embodiments, the casino's cryptocurrency may be a wrapped version of a public cryptocurrency. In still other embodiments, the casino's cryptocurrency may be, or mimic, a public stablecoin. In further embodiments, multiple casinos may participate in an enterprise blockchain or distributed ledger system, allowing efficient use of a common private cryptocurrency in any of the participating casinos with minimal costs per transaction.

Features of the disclosed embodiments will become apparent from the following detailed description, taken in conjunction with the accompanying drawings.

DETAILED DESCRIPTION

Figure 1:
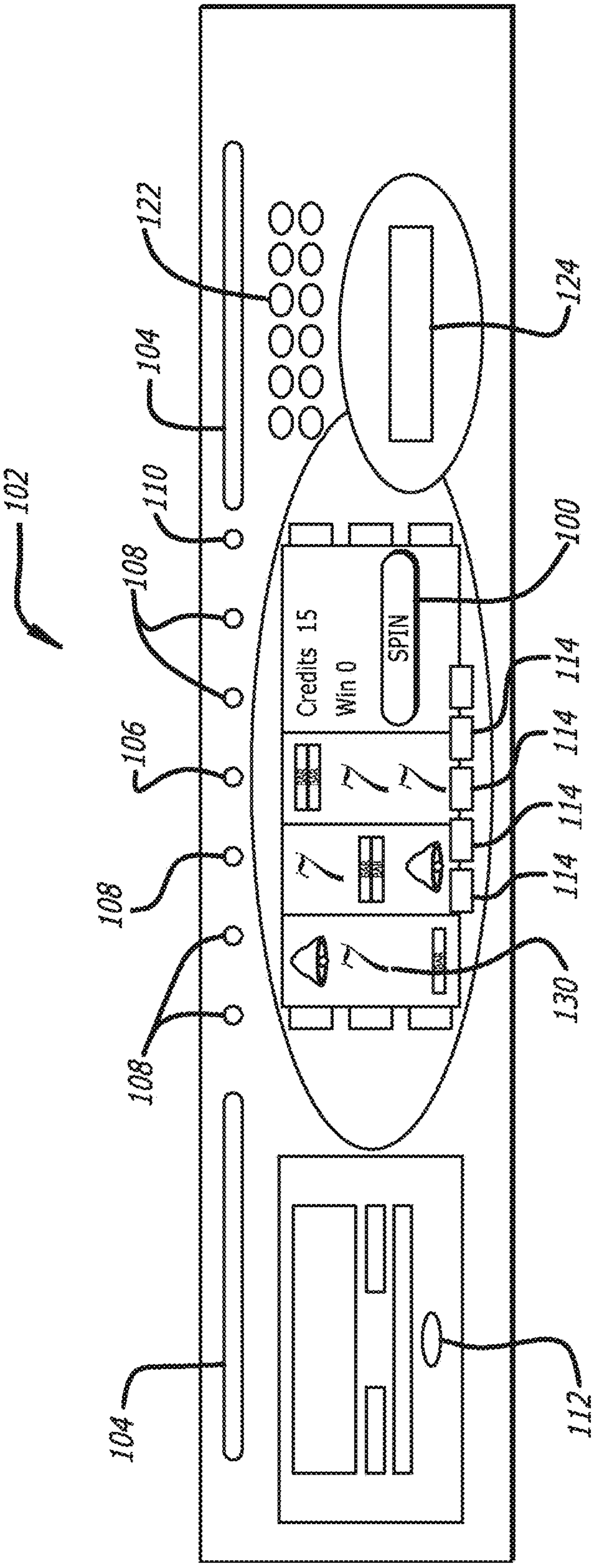
FIG. 1 is a front view of one or more embodiments of a system component panel on a gaming device used for player identification.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on smartphones (e.g., phones, tablets, etc.). When provided in a social or casual game format, the wagering game may closely resemble a traditional casino game, or it may take another form that more closely resembles other types of social/casual games. The term "casino" includes land-based casinos, racinos, and any other gaming establishments in which wagering games may be played, as well as online gaming venues such as web sites, social media applications and the like where a player's patronage of wagering games offered therein may be tracked for various purposes.

In various embodiments, one or more electronic gaming machines (EGMs) are in communication with a tracking system component of a casino gaming system that includes one or more servers or databases connected by a network. The player tracking system allows a casino to monitor the gaming activities of various players. Additionally, the player tracking system can store data related to a player's gaming habits. That is, a player can accrue player points that depend upon the amount and frequency of their wagers. Casinos can use these player points to compensate the loyal patronage of players. For example, casinos may award or "comp" free meals, room accommodations, tickets to shows, and invitations to casino events and promotional affairs.

Typically, the player tracking system is operatively connected to one or more input components at the EGMs. These input components include, but are not limited to, a slot for receiving a player tracking card, a keypad or equivalent, an electronic button receptor, a touchscreen, and the like. Biometric data related to an anonymous player who is not, yet a qualified player may be captured with a biometric input device incorporated into the player tracking subsystem of an EGM that the Player wishes to play ("the EGM"). For example, a camera, with or without player consent, may capture an image of the Player's face.

Often, the Player will already be formally enrolled in the player rating or point accruing program as a qualified player. As qualified players are typically issued player cards with magnetic stripes that can be inserted into and read by a card reader to establish a playing session, the establishment of a playing session is commonly known as "carding in." Likewise, a qualified player terminates a playing session by removing their magnetic card from the card reader ("carding out"). For the purposes of this disclosure, even though the Player may not possess a physical player tracking card, any alternate means of establishing and ending play sessions described herein, for example, as described above or via a Bluetooth pairing of the smartphone with the EGM, will also be termed "card-in" and "card-out" events, respectively.

Once the Player has carded-in, information in the Player's database record and data collected during play of the EGM may be used in connection with issuing awards, bonuses, or services to the Player. That is, information collected during the playing session are added to the Player's player record. For example, the Player's average wager size, amounts of wins and losses, time spent on the gaming device and the like may be collected and stored. If this is not the first playing session established for the Player, any new information may be combined with stored information from the Player's previous playing sessions.

The combined information may be used by one or more of the servers of the system to restrict the activities of recognized anonymous problem gamblers or banned players, to restrict illegal activities such as, but not limited to, money laundering, counterfeiting, or underage gambling, or to authenticate or provide additional security measures for electronic funds transfer authorization, transaction auditing, or account-based gaming. The information may also be used to authenticate or provide additional security measures for electronic funds transfer authorization, transaction auditing, or account-based gaming.

In accordance with some embodiments, the Player may elect to move their game credits/cash from EGM to EGM without using vouchers or tickets. For example, the Player may use a funds transfer feature of an e-wallet, such as a Unified Wallet by SG Gaming, Inc., integrated into their smartphone application. Additionally, the Player may be able to transfer cash, credit, bonus cash, bonus credits, bonus points, or restricted credits from EGM to EGM. In accordance with one or more embodiments of this disclosure, the Player may also be able to transfer cryptocurrency to, from and within the casino system. In some embodiments, the player may also be able to transfer cryptocurrency from one casino account to another casino account.

Further details related to bonusing systems including a rewards server, a gaming or slot accounting server, and player tracking systems and servers are included in U.S. Pat. No. 9,466,170, entitled "NETWORKED GAMING SYSTEM COMMUNICATION PROTOCOLS AND METHODS," fully incorporated herein by explicit reference.

The above embodiments and others are illustrated and described herein, by way of example only, and not by way of limitation. Referring now to the drawings, and more particularly to FIGS. 1-20, there are shown illustrative examples of player tracking devices to facilitate the establishment of a play session for player tracking purposes, the movement of funds to and from an EGM and various uses of cryptocurrency within the casino environment.

FIG. 1 illustrates a front view of one embodiment of a system component panel 102 on the EGM. In this embodiment, a biometric input device is a camera 106 for biometric facial recognition and/or image capture/surveillance purposes integrated with an iView® display 130 manufactured by SG Gaming, Inc. As shown in FIG. 1, the system component panel 102 also includes a proximity detection antenna 104 (and circuitry) and light emitting diodes (LEDs) 108 projecting visible or infrared light for facial illumination. The system component panel 102 may also include a microphone 110 for player communication to a casino help desk or other services, voice recognition and the like. As shown in FIG. 1, the system component panel 12 also includes a PIN pad 122 for password/PIN entry/feature request. The system component panel 12 may also have a player card reader 124. The player card reader 124 may be a magnetic stripe or smart card reader. Additionally, the system component panel 102 may also include a dual port, IP, serial, or USB printer 112. Optionally, the system component 102 may include a fingerprint reader (not shown) that is separate and distinct from a biometric touch screen 100. As shown in FIG. 1, soft-key buttons 114 are positioned around the display 10. The functions of the soft-key buttons 114 are presented on the display 130, and the functions of the buttons may be changed. As those skilled in the art will appreciate, the system component panel 102 may include less than all the components (or different combination of components) from that which is depicted in FIG. 1. Some or all of these peripheral components may be connected to a base EGM processor board rather than the iView processing board or to a game monitoring unit (GMU).

Figure 2A:
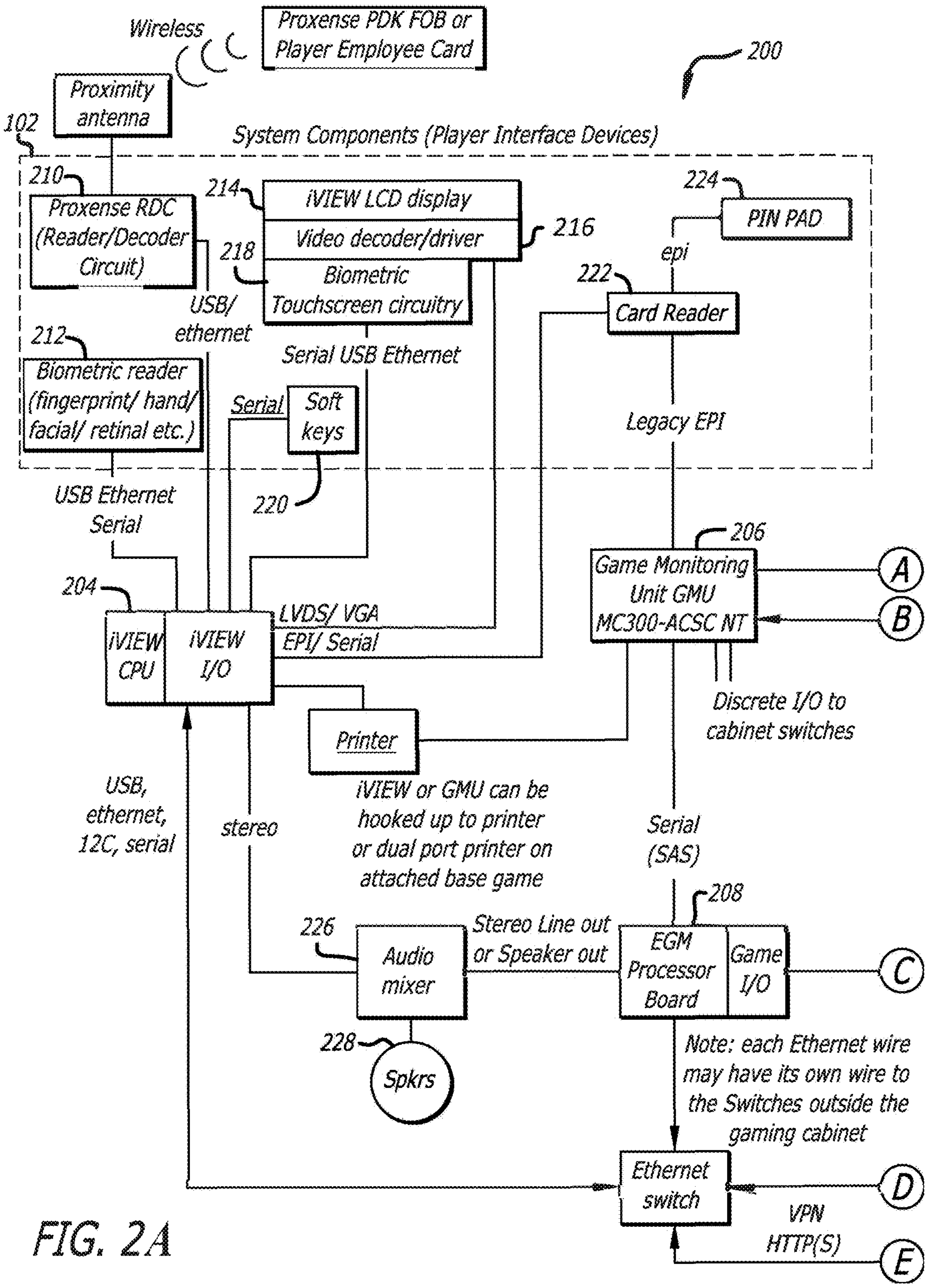
FIGS. 2A and 2B are a combined block diagram of one or more embodiments of an electronic gaming machine (EGM) and its system components.

In one embodiment, the various components of the system component panel 102 are mounted on a metal bracket (not shown) that may be fixed to the EGM. As shown in FIG. 2A, these components are linked into a virtual private network of the system components in the EGM. The system components include an iView processing board 140 and a GMU processing board 142. The iView processing board 140 and the GMU 142 are connected to various systems and servers such as, but not limited to, a slot accounting system (SMS/SDS™), player tracking system (CMP™/CMS), biometric authentication servers, print servers, bonusing servers, download/configuration servers, bonus game servers (e.g., Power Rewards™ server or Power Winners™ servers), iView media servers, advertisement servers, offer servers, and other servers throughout the casino.

Figure 2B:
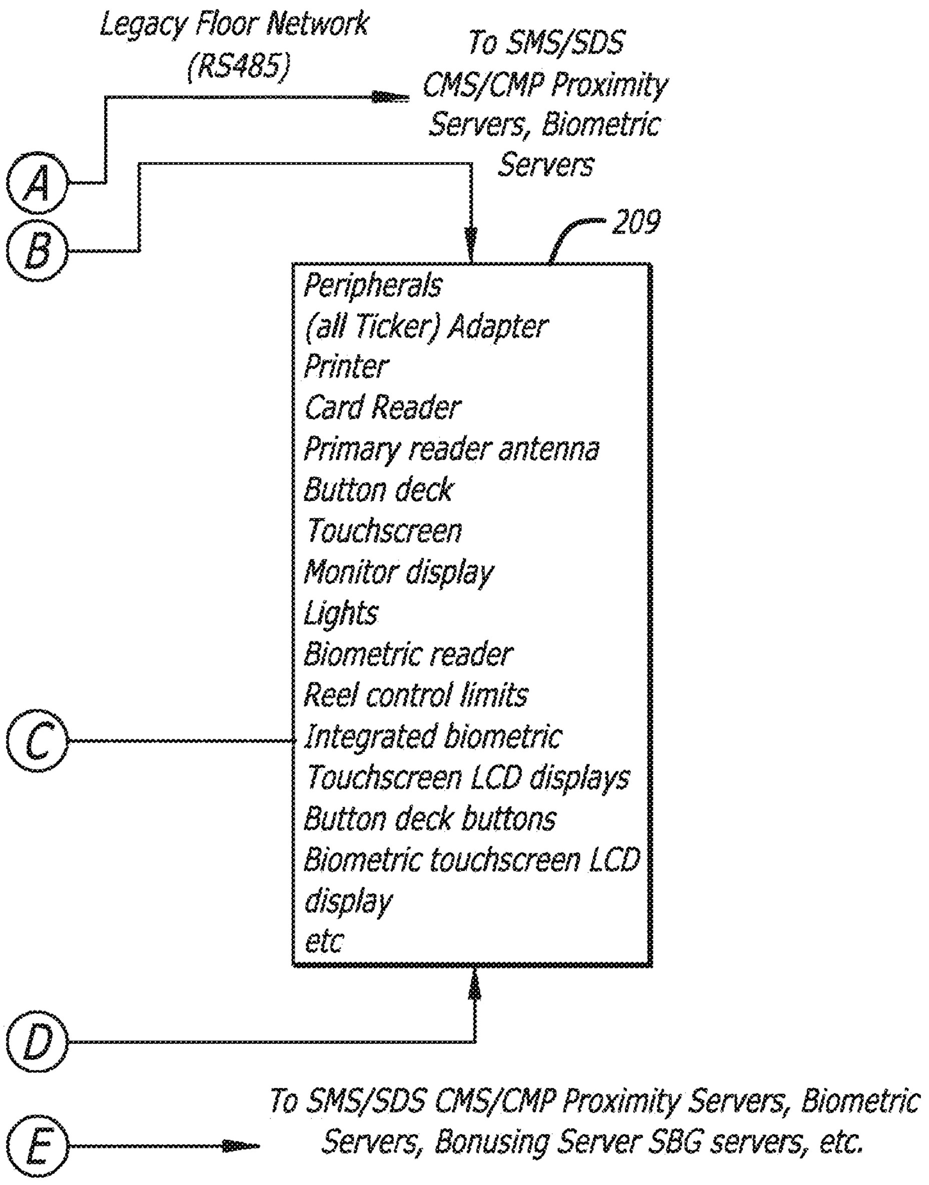

FIG. 2A illustrates one embodiment of the EGM 200 and the various components included with the EGM 200. As shown in FIG. 2A, the EGM 200 includes system component panel 102, an iView processing board 204, game monitoring unit (GMU) processing board 206, EGM processor board 208, and one or more peripherals 209 in communication with the EGM processor board. The system component panel 102 includes a proximity sensor 210 (having a reader/decoder circuitry), a biometric reader 212, a video display 214 (and associated decoder and drivers 216), a biometric touchscreen device 218, one or more soft keys 220, a card reader 222, and a PIN pad 224. As shown in FIG. 2, the proximity sensor 210, biometric reader 212, video display 214, biometric touchscreen device 218, and one or more soft keys 220 communicate with the iView processing board 204 via USB, serial, parallel, RS485, or Ethernet connections. The card reader 222 and PIN pad 224 may communicate with the GMU via EPI protocol. Alternatively, the system components are directly IP addressable on the gaming network. The proximity sensor may be of any type, including a Bluetooth® receiver capable of determining the relative signal strength of neighboring Bluetooth devices or a passive infrared (PIR) sensor that measures infrared (IR) light radiating from players and objects within its field of view.

The EGM processing board 208 is in communication with an audio amplifier/mixer 226 (which, in turn, is in communication with speakers 228), and one or more servers in the gaming network via an Ethernet switch 230. Additionally, as shown in FIG. 2A, the EGM 208 is in communication with the iView processing board 204 and the GMU 206.

As shown in FIG. 2A, the iView processing board 204 and the GMU 206 are separate components, but the GMU and iView processing board may be combined into one device. The combined device may have video mixing technology to mix video from the EGM processor signals with a video source for the iView display to present a game, game information, bonusing, or other information on any monitor on the gaming device in a Picture in Picture (PIP) or full screen format.

The various components of the system component panel may have USB, serial, parallel, RS485, or Ethernet connections to the system components in the gaming cabinet or these components may be directly IP addressable on the gaming network. The GMU may have a connection to the base game through a serial SAS connection or optional G2S classes over Ethernet. The system components in the gaming cabinet may be connected to various servers using HTTPS over Ethernet. Firmware, media, operating systems, and configurations may be downloaded to the system components from the servers. Generally, this data is authenticated prior to installation on the system components.

Figure 3:
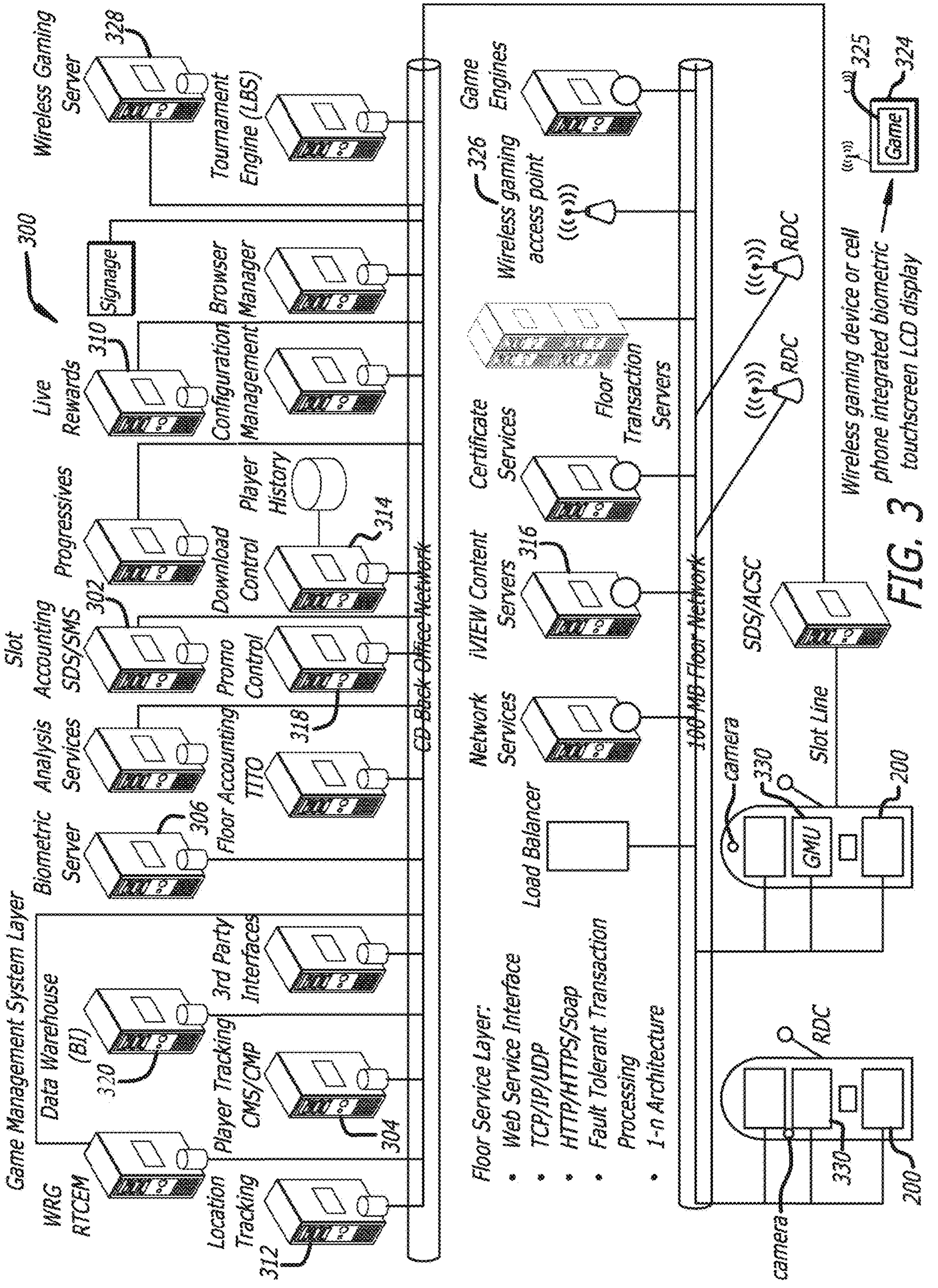
FIG. 3 is a network drawing of the various components in one or more embodiments of a casino gaming system.

FIG. 3 illustrates one embodiment of a gaming system 300 having one or more electronic gaming machines (EGMs) 200 incorporating at least one biometric input device. The electronic gaming machines 200 may be located in a single casino or in multiple gaming locations. As shown in FIG. 3, the electronic gaming machines 200 are connected to the slot system (SMS/SDS) 302, player tracking system (CMP/CMS) 304, biometric authentication servers 306, print servers (not shown), bonusing servers (e.g., Live Rewards server) 310, proximity location-based tracking servers 312, download/configuration servers 314, iView media servers 316, advertisement servers 318, offer servers, responsible gaming servers and other servers throughout one or more casinos.

In one embodiment, the system components in the electronic gaming machines 200 are connected to the servers via HTTPS over Ethernet. In other embodiments, the system components are connected to the servers by any connections known or developed in the art. Firmware, media, operating systems, and configurations may be downloaded to the system components from one or more servers in the gaming system 300. Again, downloaded data is typically authenticated prior to installation on the system components.

As shown in FIG. 3, the gaming system 300 includes wireless gaming devices 324 having biometric input devices 325, network access points 326, and wireless gaming servers 328. In one embodiment, the electronic gaming machines 200 and player tracking devices (GMU) 330 have integrated biometric input devices that act as both a user interface and biometric scanner. In one or more embodiments, wireless gaming devices 324 may include smartphones having a biometric input device, for example, a camera used to obtain facial recognition data or a biometric touchscreen display or a fingerprint sensor used to collect fingerprint data. The gaming system includes a number of servers, for example, without limitation, Live Rewards server 310, Slot Accounting Server 302, Promotional Control server 318, Download Control Server 314, Biometric Server 306, Location Tracking Server 312, Player Tracking Server 304, iView Content server 316, and Data Warehouse 320.

In one embodiment, the Player downloads the mobile application (SG Universe) and registers through the mobile application. A player ID is generated and associated with the Player. For example, a mapping between this player ID and the Player's smartphone is kept in a record in the player tracking database. The data may be stored in encrypted format to enhance security. The Player may also be asked to supply a username and PIN associated with the new record. In one or more embodiments, the Player may elect to provide a cryptocurrency address associated with a cryptocurrency wallet and the Player ID may be associated with this address. In some embodiments, the Player may similarly register at a casino desk or kiosk. Further details related to wireless pairing of the Player's smartphone and an EGM for the purposes of establishing a playing session, funds transfers to and from the EGM and the like, including hardware and software details of electronic gaming machines, player tracking systems, applications and systems capable of supporting the various embodiments described above, are included in U.S. Pat. Publication 2016/0093166A1, entitled "SYSTEM AND METHOD FOR WIRELESS CARD-IN AND CARD-OUT," fully incorporated herein by explicit reference.

Figure 4:
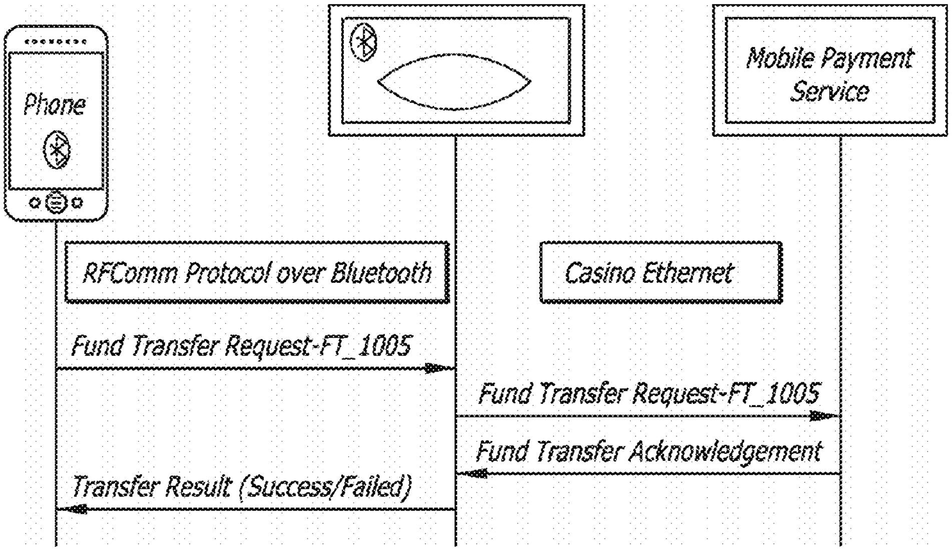
FIG. 4 illustrates a logic diagram with the funds transfer from the smartphone to the EGM/iView in accordance with one or more embodiments.

Referring to FIG. 4, mobile payment options may be extended to the Player in accordance with one or more embodiments. The Player may deposit cash at the cage against their mobile wallet and transfer it to the EGM for use. Typically, the Player may be required to pass an additional authentication procedure before the funds transfer can occur. As shown in FIG. 4, funds are transferred from the smartphone to the EGM. The Player first pairs the smartphone with the EGM, for example, via Bluetooth. Using the mobile application (e.g., SG Universe) or a separate e-wallet application on the smartphone (e.g., Unified Wallet), the Player selects the amount to be transferred. Once the funds transfer is initiated, the mobile application asks the Player to authenticate himself with their PIN. The requested funds are then transferred to the EGM through the mobile application and a success or error message is displayed on the smartphone and on the EGM. The iView (or other system interface device on the EGM) then sends the Player-entered amount to a casino mobile payment service. The mobile payment service authorizes the payment and sends the acknowledgement to iView. iView then uses an AFT (automatic funds transfer) request to transfer the funds to the EGM's credit meter. The iView also communicates the status of the funds transfer to the mobile application or e-wallet, which displays the funds transfer status and the current funds balance on the screen. Funds transfer from the smartphone to the EGM can happen multiple times while the Player is carded in. For increased security, the above process may be executed for each funds transfer request, with the Player entering their PIN each time. In accordance with one or more embodiments, the funds transferred to the EGM may be stored in the Player's wallet in the form of cryptocurrency or a wrapped cryptocurrency, which will be described further below.

Figure 5:
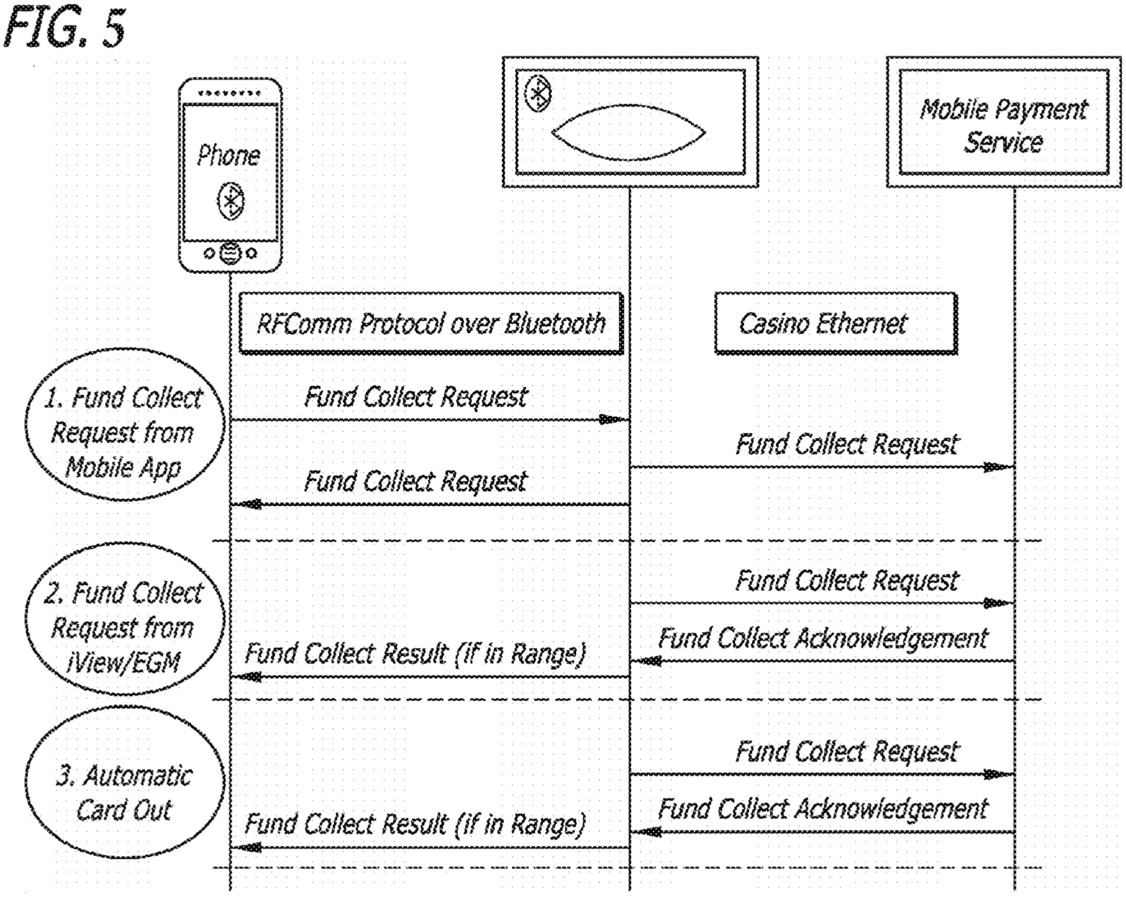
FIG. 5 illustrates a logic diagram with the funds transfer from the smartphone to the EGM/iView to the mobile wallet in accordance with one or more embodiments.

As shown in FIG. 5, in accordance with other embodiments, funds are instead transferred from the EGM to the smartphone to cash out credits on the EGM to the Player's mobile wallet. This can occur when the Player presses a "collect" button on either the Bluetooth-enabled EGM or the smartphone, when the Player presses a "card-out" button, or when the Player moves away from the EGM for more than a predetermined period or is otherwise automatically carded-out. This ensures that no other player can play with credits left on the EGM. Regardless of how the transfer was initiated, the iView client sends a "collect" message to the mobile payment service. The mobile payment service authorizes this request and sends an acknowledgement to the iView. The iView attempts to send the acknowledgement to the smartphone over Bluetooth. If the Player is close enough to the EGM, the mobile application receives the information and updates its screen accordingly. If, however, the Player has moved away from the EGM, iView cannot communicate over Bluetooth. In this case, the Player may later receive confirmation of the transfer of funds to their mobile wallet when carded-in again at another EGM, at a kiosk, etc. As above, in accordance with one or more embodiments, the funds transferred to the mobile wallet may take the form of a cryptocurrency or a wrapped cryptocurrency, as will be described below.

Figure 11:
FIGS. 11-17 illustrate examples of screen displays that may be presented during the depositing of cryptocurrency into the Player's casino account in accordance with one or more embodiments.

The Player's mobile wallet may be under control of a digital unified wallet manager, which is a combined interface exposed by multiple services aggregated into a single virtual service. The unified wallet manager provides a secure, auditable, scalable gaming wallet capable of managing real money, with multiple currency support, bonus points or promotions, loyalty points, virtual credits, and play or virtual money for multiple vertical gaming systems, an example of which is Unified Wallet by SG Gaming, Inc. Further details related to unified digital wallets are included in U.S. Pat. No. 10,607,442, entitled "A UNIFIED DIGITAL WALLET," fully incorporated herein by explicit reference. In some embodiments, access to the unified wallet manager may be incorporated into the Player's mobile application (e.g., SG Universe). FIG. 11, in accordance with one or more embodiments, illustrates an example of the login screen of the Player's mobile application.

Figure 6:
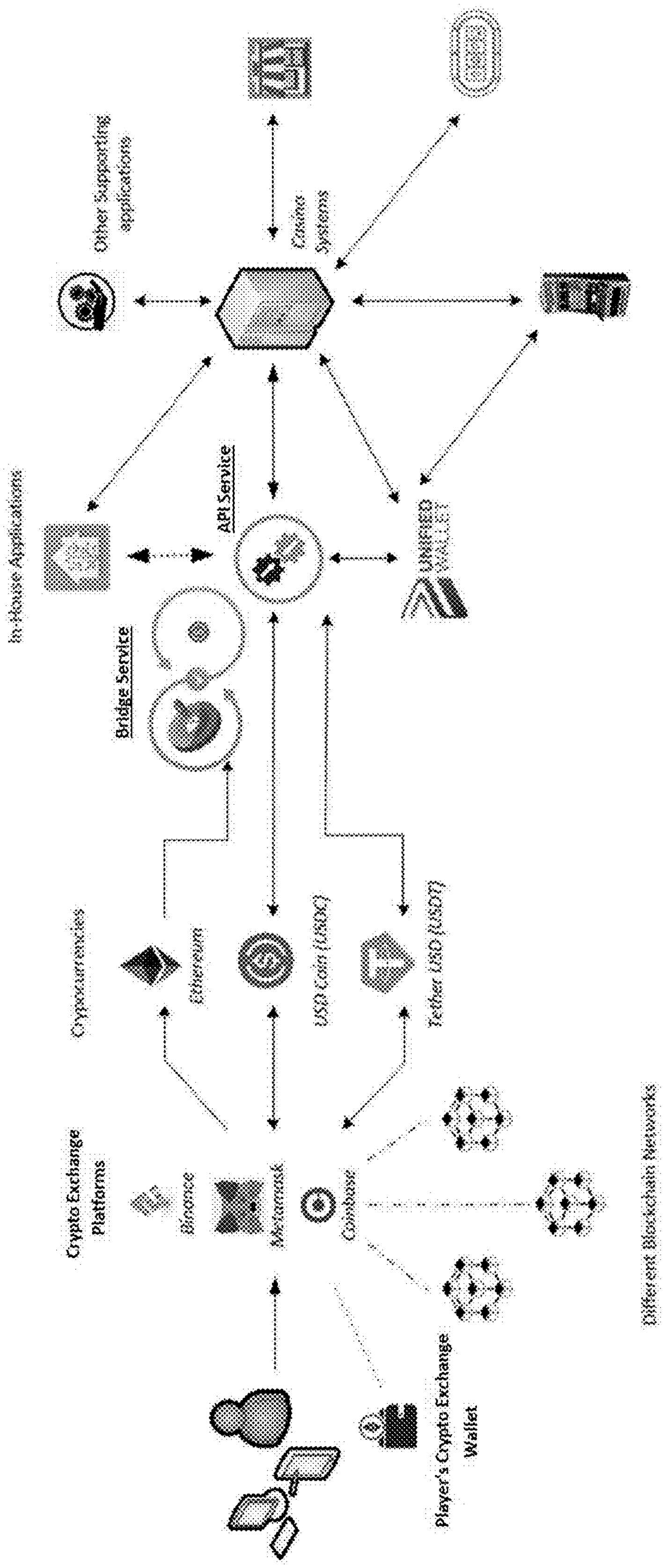
FIG. 6 is a network drawing of the various components in one or more embodiments of a casino gaming system in accordance with one or more embodiments.

FIG. 6, in accordance with one or more embodiments, illustrates a casino system that allows the use of cryptocurrency with the Player's unified wallet. Supported cryptocurrencies may include one or more of Bitcoin, Ethereum, USD Coin, Tether, etc. In these embodiments, the Player's mobile application may interface to a crypto exchange wallet of the Player. The crypto exchange wallet provides access to a public cryptocurrency exchange and maintains a cryptocurrency balance for the Player outside of the casino system. Examples of cryptocurrency exchanges include Binance, Metamask, bitpay, and Coinbase. The Player's mobile application provides a bridge between the crypto exchange wallet and the casino system to allow the transfer of cryptocurrency in and out of the Player's unified wallet.

In one or more embodiments, application program interfaces (API's) support a "bridge" capability that applies current exchange rates to the cryptocurrencies being converted to and from cash in the Player's unified wallet account with the casino. The API's may be provided by a business to business (B2B) partner, for example, Mena Software LLC, whose product CryptoAPIs may perform functions such as, but not limited to, handling blockchain transactions between the Player's crypto exchange wallet and a "transfer wallet" associated with the Player's unified wallet and between the Player's crypto wallet and a casino-managed "main wallet." The API's may further set transaction limits, provide deposit call backs to enable the unified wallet to add converted cryptocurrency to its balance, provide authorization functions to ensure secure communication between the unified wallet and the APIs, and provide high availability of interactions with the public blockchains. The API's may also support Know Your Customer (KYC) analysis of crypto addresses to block transactions of potential bad actors. Further, the API's may ensure the possibility of high transaction volumes, provide an interface to the crypto exchanges via REST and web sockets, provide competitive exchange rates (0.015%-0.1%), support potentially hundreds of different cryptocurrencies, support 2FA verification, provide Federal Deposit Insurance Corporation insured balances for cryptocurrencies such as Binance US, and provide different types of order transactions such as limit orders, market orders, stop-limit orders, etc.

Figure 7:
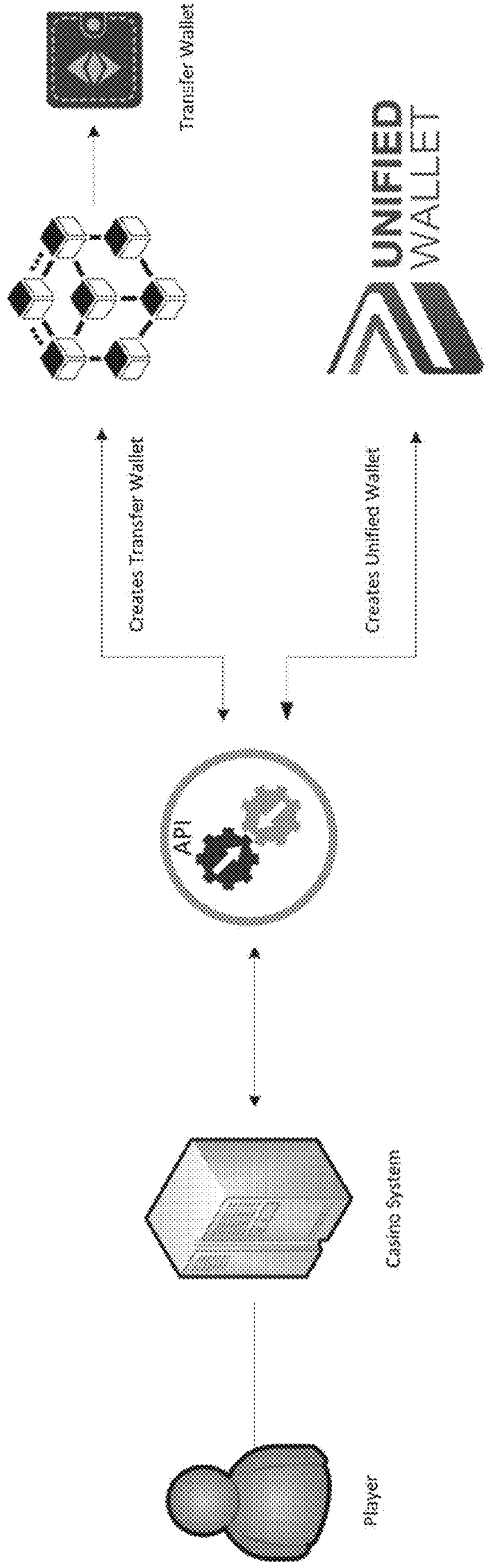
FIG. 7 illustrates a logic diagram of the creation of an exchange wallet in accordance with one or more embodiments.
Figure 8:
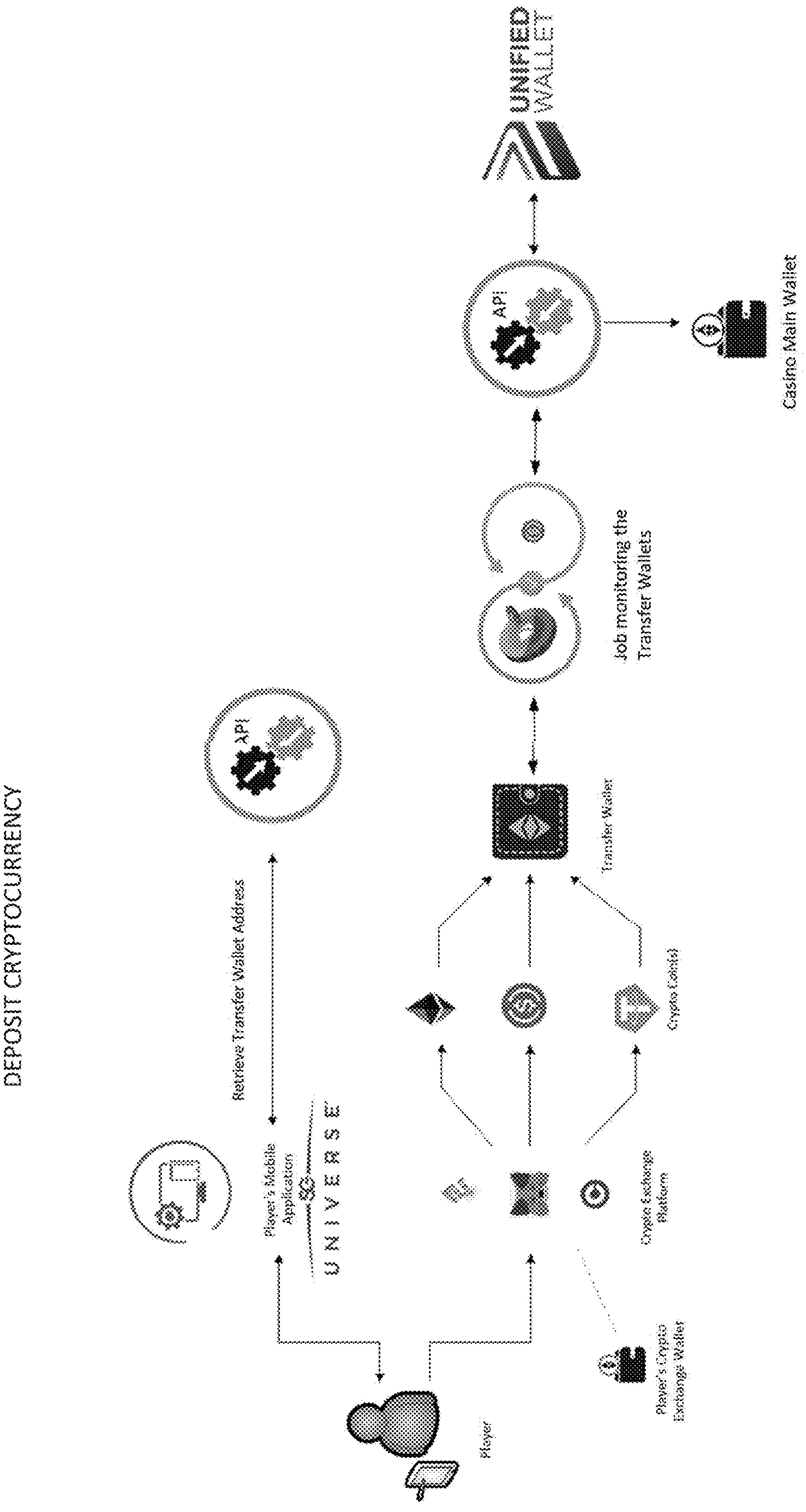
FIG. 8 illustrates the depositing of cryptocurrency into the Player's casino account in accordance with one or more embodiments.

As shown in FIG. 8 in accordance with one or more embodiments, the Player may ask the mobile application to withdraw, for example, from the Player's crypto exchange wallet, a certain amount of cryptocurrency for deposit into the Player's unified wallet as cash. Because the API's can only transfer cryptocurrency from one crypto exchange address to another, a "transfer wallet" may need to be created by the API's and associated with the Player's unified wallet, as shown in FIG. 7. Once the transfer wallet has been created, the Player's mobile application stores the blockchain address of the transfer wallet for future use, as described below, or the Player may have to specify the blockchain addresses of the various wallets involved in the transfer each time. In either case, once the addresses have been identified, the APIs perform some or all of the following functions. First, the specified amount of cryptocurrency is transferred from the Player's crypto exchange wallet to the transfer wallet. FIGS. 12-16, in accordance with one or more embodiments, illustrate application screens that may be presented to the Player during this process.

Figure 12:
Figure 13:
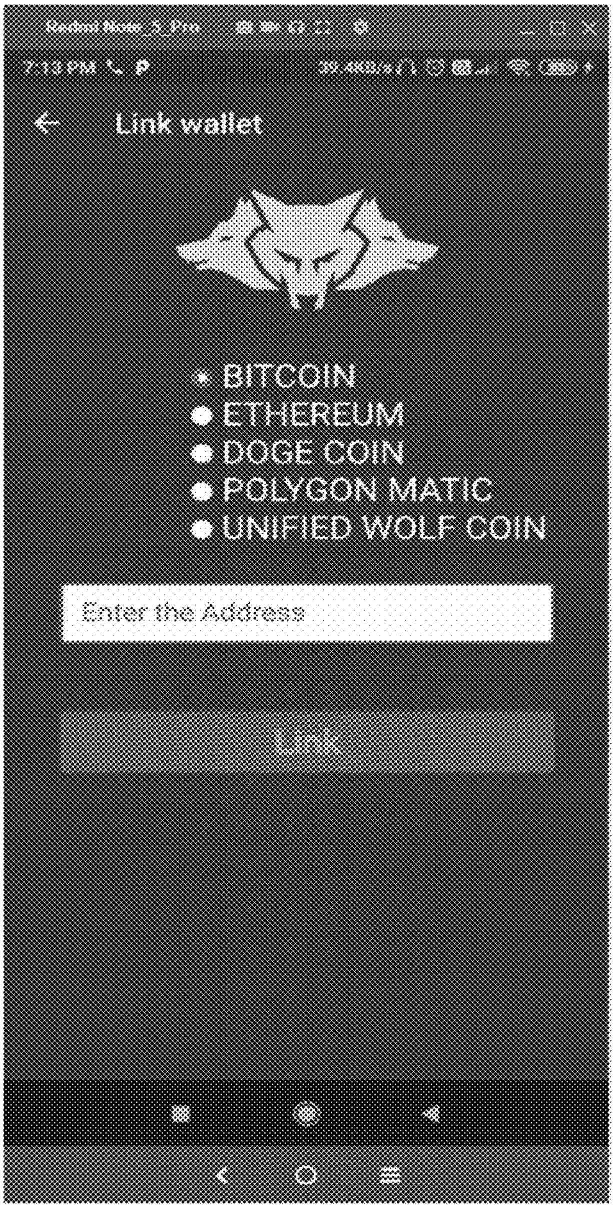
Figure 14:
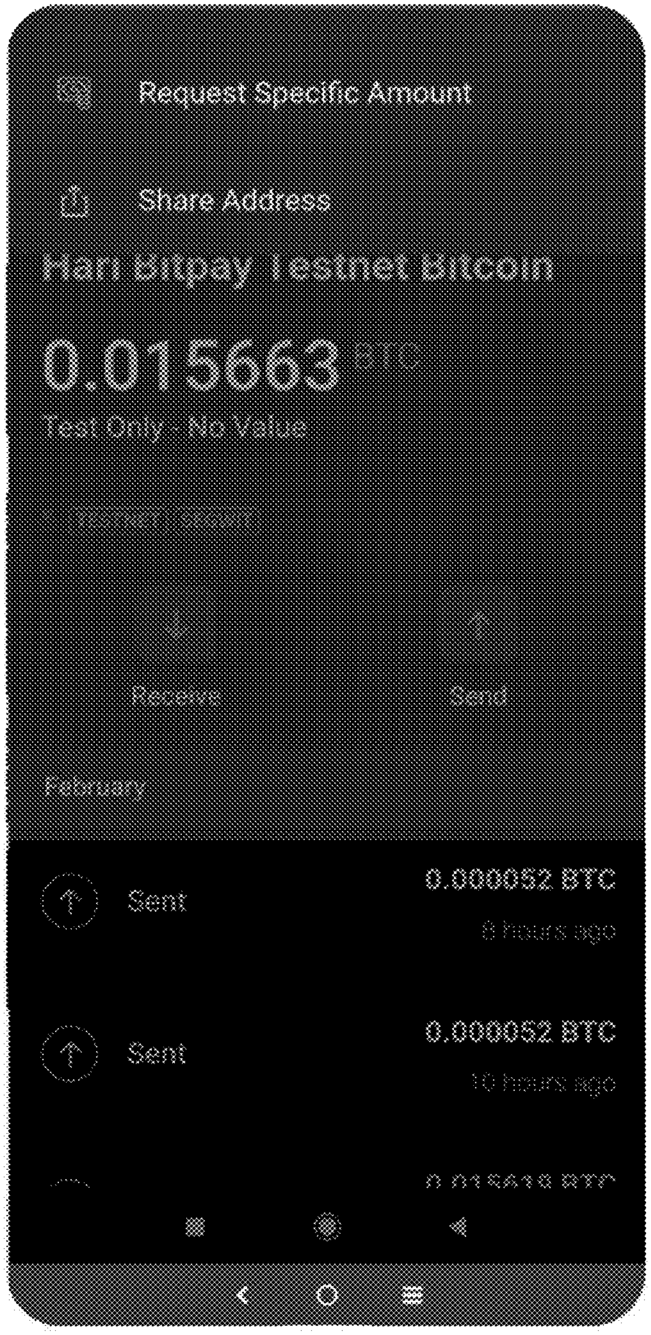

In FIG. 12, the Player selects "Deposit Crypto" from a menu screen of the mobile application. Depending on how many crypto exchange wallets the Player has, and which cryptocurrencies those exchanges support, the Player may own various cryptocurrency balances, for example, the Player may own Bitcoin, Ethereum, Doge Coin, etc. In the example of FIG. 14, the Player specifies the desire to deposit some Bitcoin into the unified wallet.

Figure 15:
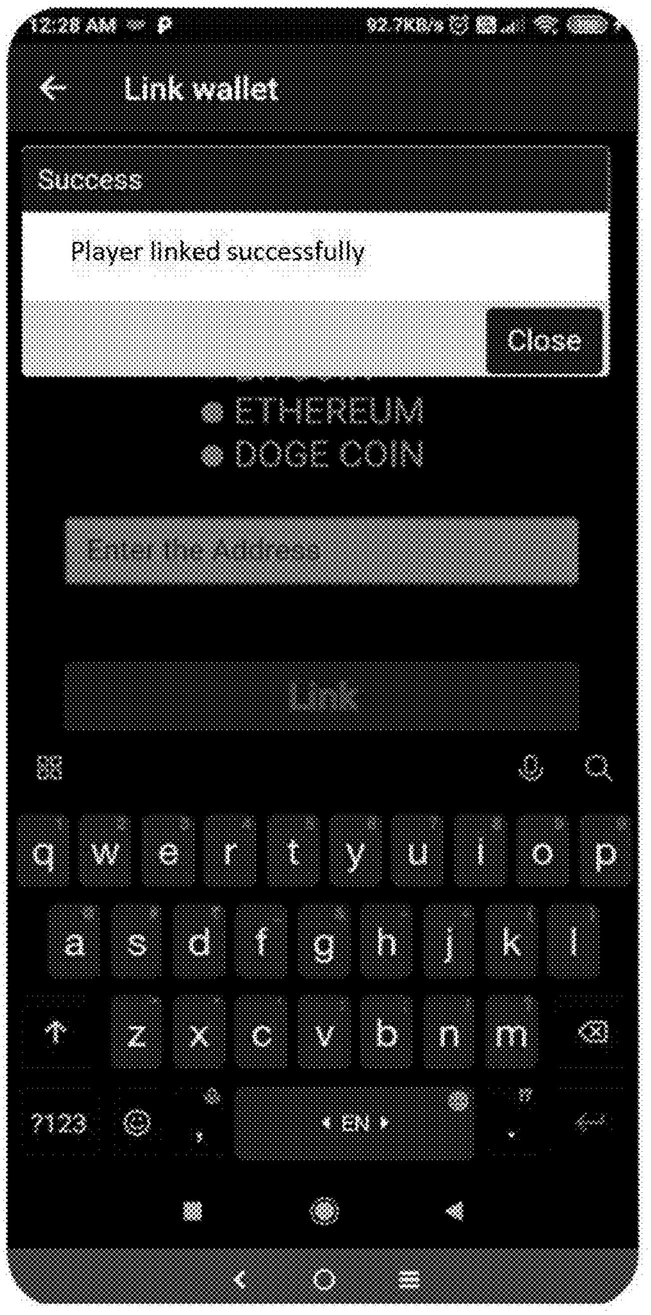

In the example, while the "receiving" blockchain address of the transfer wallet is known, the Player's crypto exchange "sending" blockchain address is not known to the mobile application. The Player is asked to enter the blockchain address assigned to the Player by the crypto exchange wallet associated with Bitcoin. As illustrated in FIG. 14, the mobile application may invoke the crypto exchange wallet application to facilitate the sharing or copying of the blockchain address into the mobile application. A successful linkage between the mobile application and the Player's crypto wallet is illustrated by FIG. 15.

Figure 16:
Figure 17:
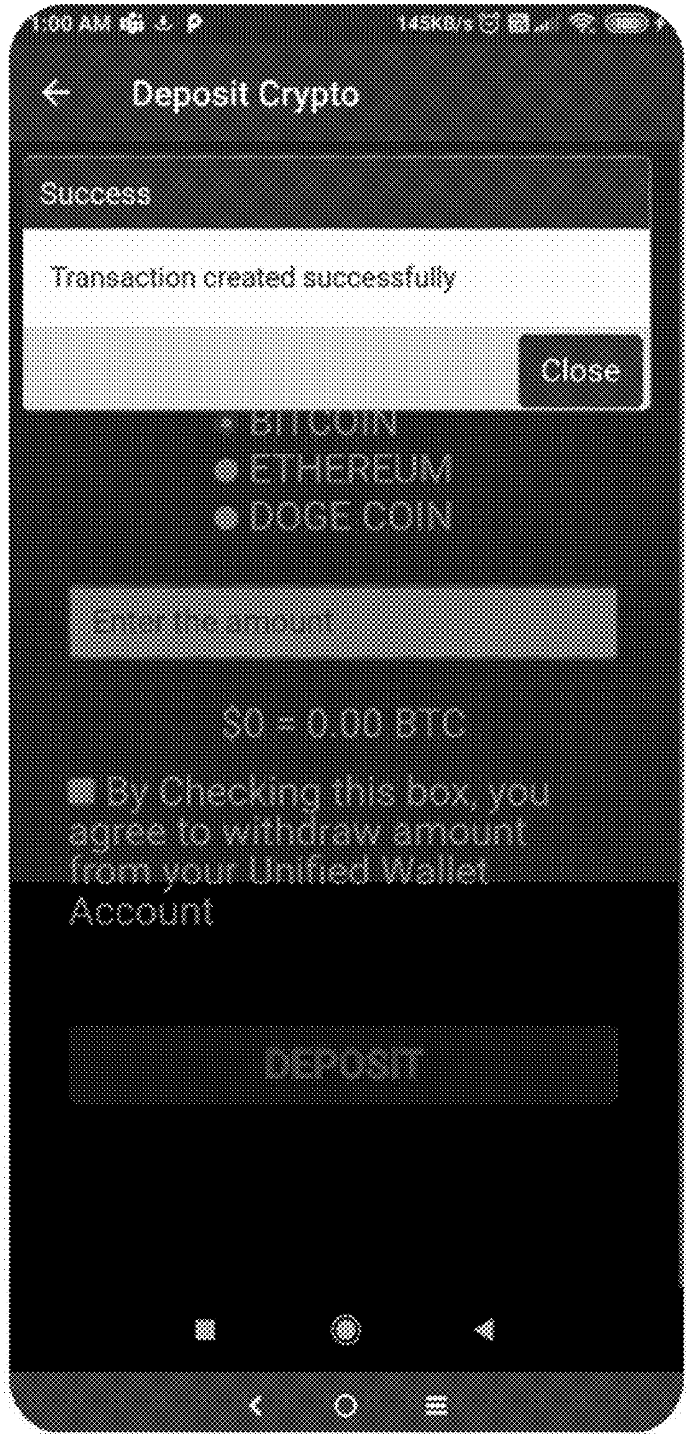
Figure 18:
FIGS. 18-22 illustrate examples of screen displays that may be presented during the withdrawal of cryptocurrency from the Player's casino account in accordance with one or more embodiments.

In FIG. 16, the amount of cryptocurrency to deposit into the mobile wallet is requested and entered. Once the mobile application has the crypto exchange blockchain address, it can request that the APIs withdraw the specified amount of Bitcoin from the crypto exchange wallet and send it to the transfer wallet as though the crypto exchange wallet had performed the transaction. (FIG. 17)

In alternate embodiments, the Player's mobile application and the APIs are not used to transfer the cryptocurrency from the crypto exchange wallet to the transfer wallet. Instead, Player identifies the "receiving" blockchain address of the transfer wallet to the crypto exchange wallet and uses the crypto exchange wallet application to move the desired amount of cryptocurrency to the transfer wallet.

The casino system monitors the balance of each player's transfer wallet. When cryptocurrency appears in the Player's transfer wallet, a "bridge" service (FIGS. 6 and 8) of the system computes the corresponding cash value of the cryptocurrency and deposits that amount into the associated player's unified wallet account as if it had been a cash deposit. The cryptocurrency is removed from the transfer wallet and deposited into a casino "main wallet," which holds all of the cryptocurrency owned by the casino. The cash in the unified wallet is then available for use by the Player. For example, the credits may be transferred to an EGM, as illustrated by FIG. 4.

Figure 9:
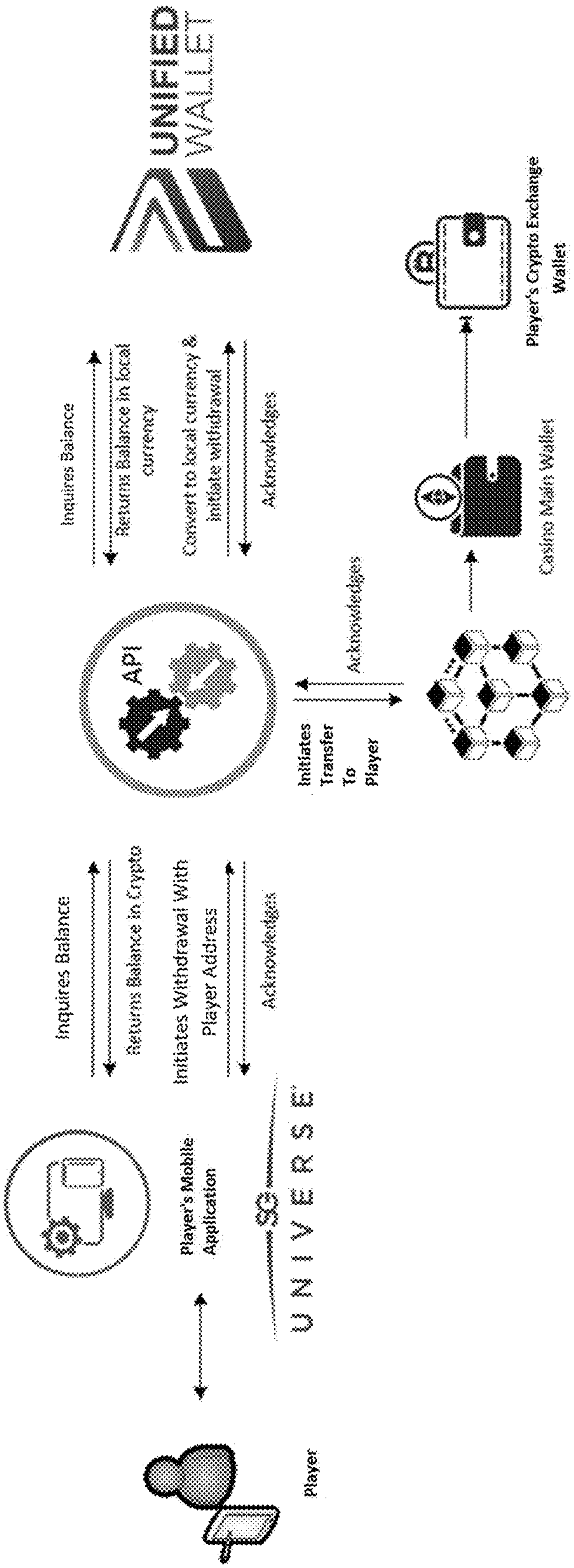
FIG. 9 illustrates the withdrawal of cryptocurrency from the Player's casino account in accordance with one or more embodiments.

Similarly, the Player may issue a request from the mobile application to the system to withdraw funds from their unified wallet into cryptocurrency. As illustrated by FIG. 9, the system decrements the unified wallet cash balance by the requested amount and, via the APIs, determines the proper amount of cryptocurrency to withdraw from the casino main wallet. In the request, the mobile application provides the Player's crypto exchange wallet address, which is used by the APIs to move the cryptocurrency from the casino main wallet directly to the Player's crypto exchange wallet without the need for the transfer wallet.

As in the deposit process, the Player selects "Withdraw Crypto" from the menu screen depicted in FIG. 12. The Player selects the form of cryptocurrency to be received. The mobile application polls the system for the Player's unified wallet cash balance in the requested cryptocurrency units and the Player chooses the amount of cryptocurrency be deposited to the corresponding crypto exchange wallet in FIG. 18.

Figure 19:
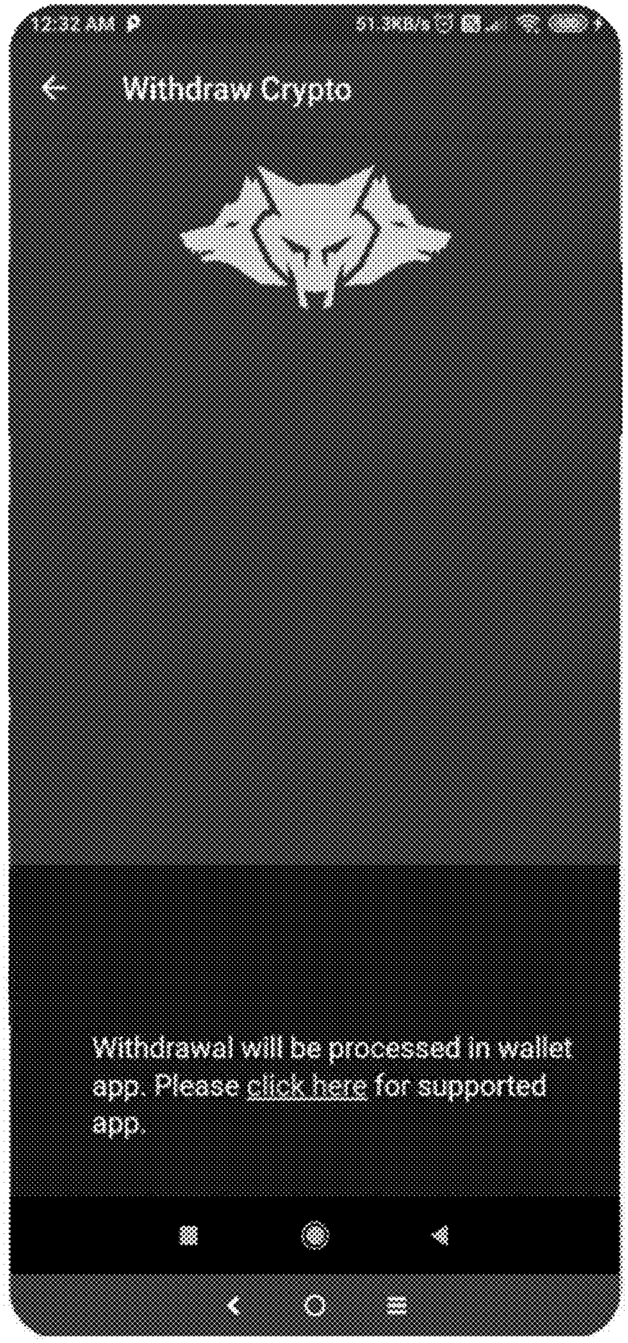
Figure 20:
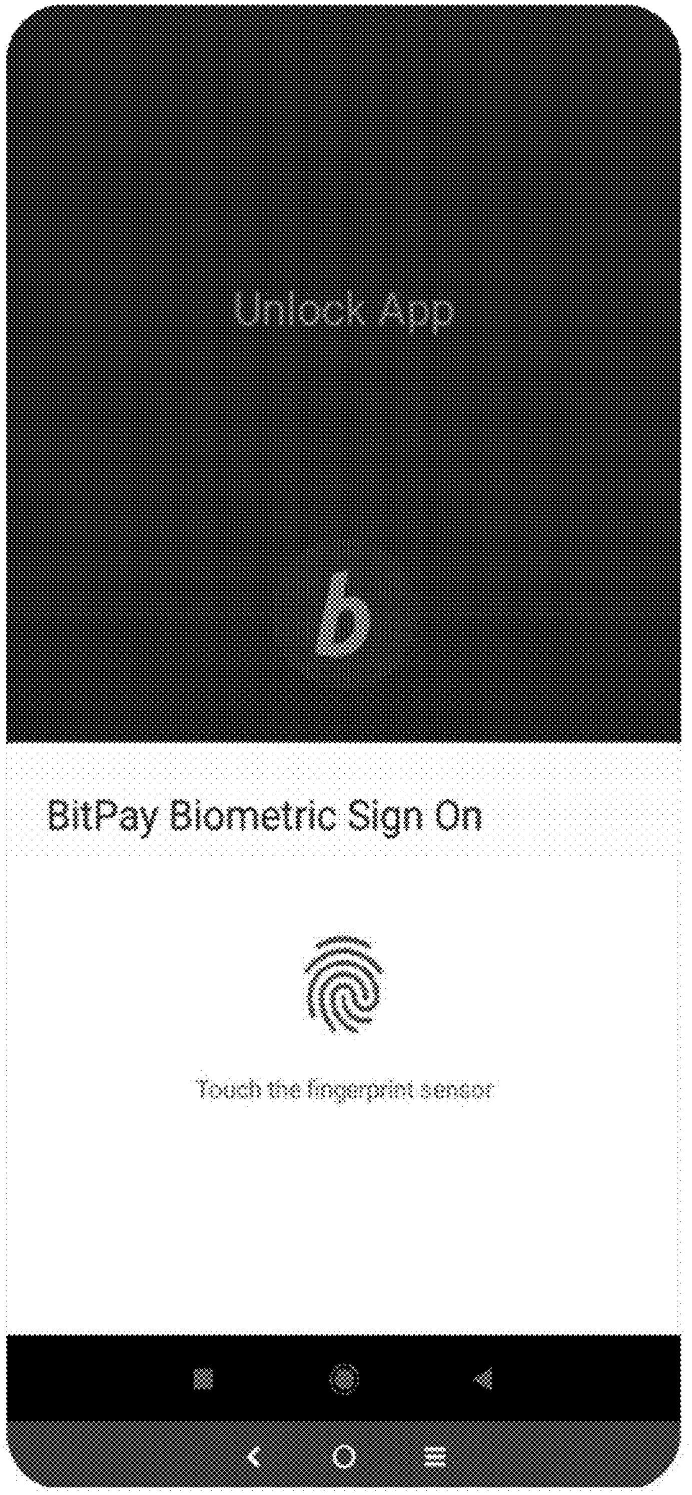
Figure 21:
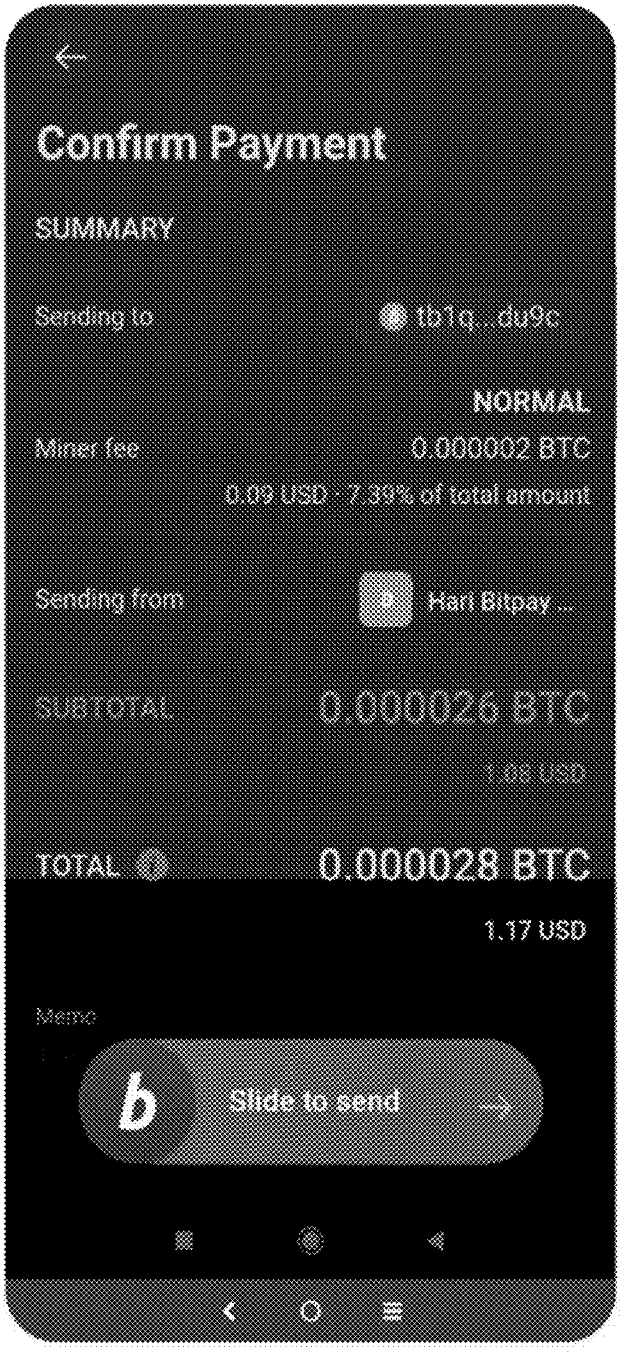
Figure 22:
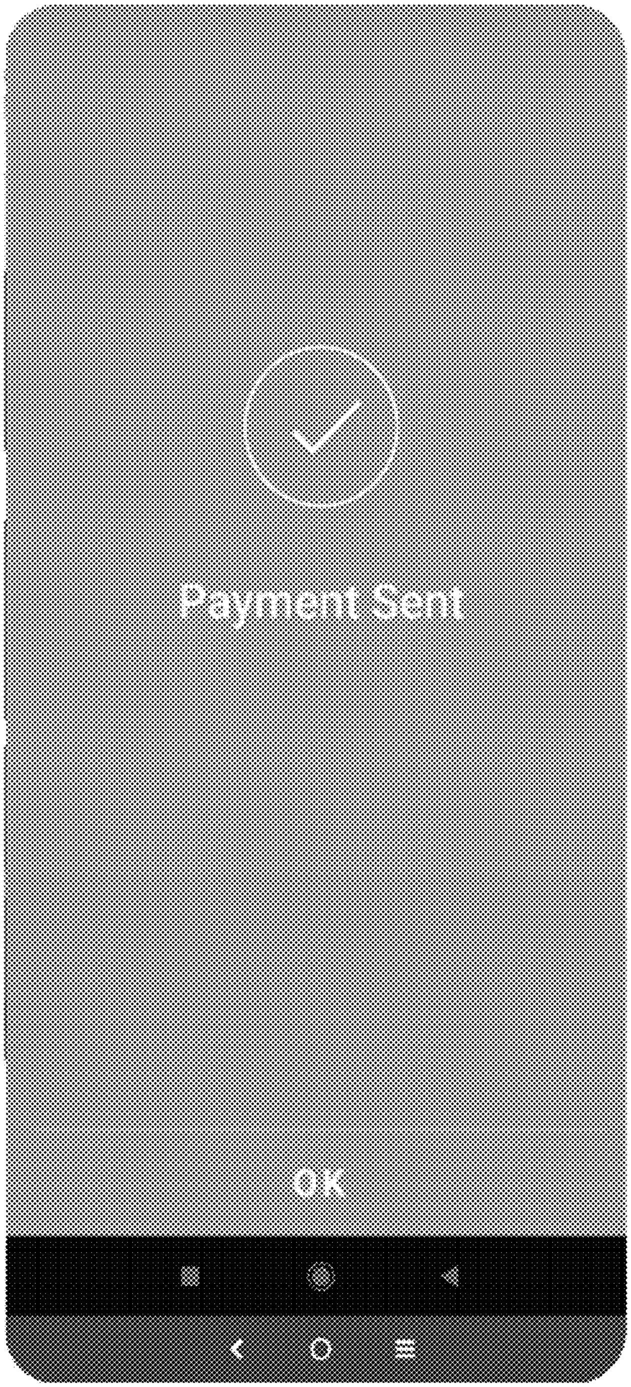

In the example shown, the mobile application does not control the cryptocurrency withdrawal process. Rather, the system decrements the Player's unified wallet cash balance and, if not already known by the mobile application, provides the main wallet's blockchain "sending" address to the mobile application, which may then forward it to the crypto exchange wallet. In FIG. 19, the Player is informed that the crypto wallet application will be used for the withdrawal. In FIG. 20, the relevant application, in this case, BitPay, has been invoked and the Player is requested to log into the crypto exchange wallet. In FIG. 21, a BitPay application screen presents details of the pending transaction, and the Player is asked to confirm them prior to transferring the cryptocurrency from the casino main wallet to the Player's crypto exchange wallet. The successful conclusion of the transaction is reflected by FIG. 22.

Figure 10:
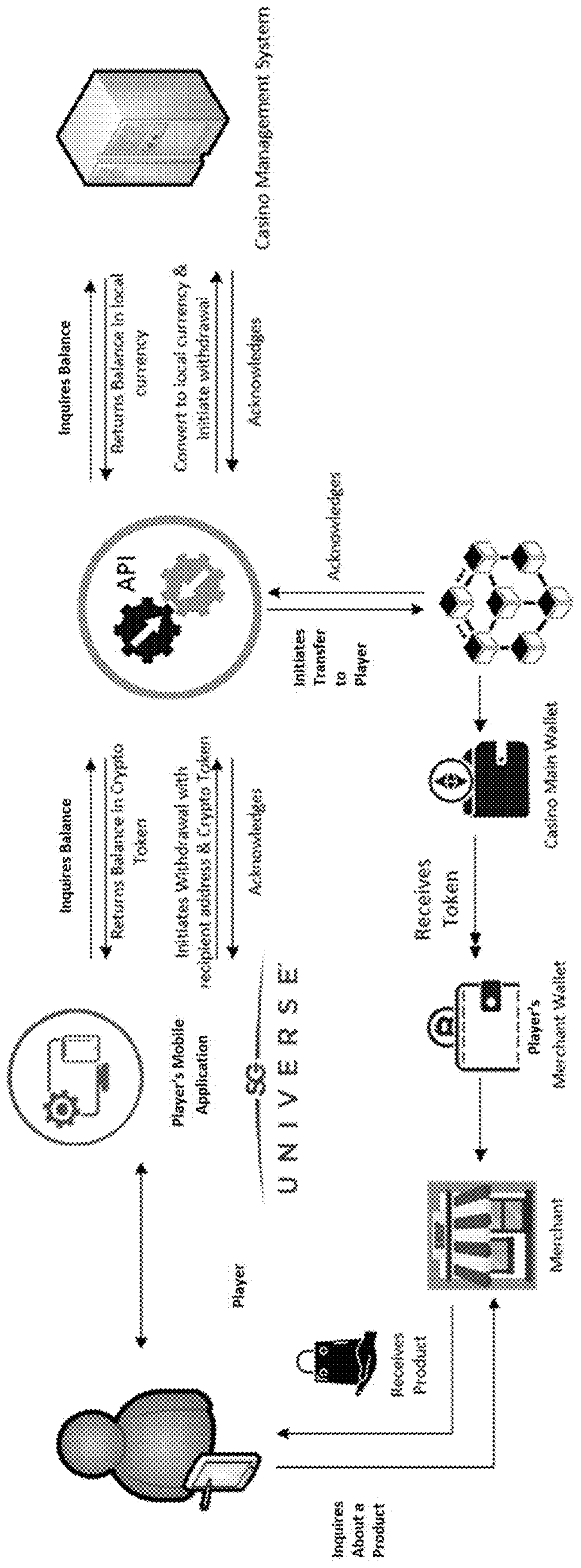
FIG. 10 illustrates the conversion of loyalty points to cryptocurrency in accordance with one or more embodiments.

In still other embodiments, as illustrated by FIG. 10, the Player's loyalty point balance may be exchanged for cryptocurrency. Traditionally, loyalty points have no cashable value except on the issuing platform, for example, only within the casino enterprise issuing the loyalty points. In the disclosed embodiments, however, the Player may, in some cases, convert loyalty points earned at the casino into cryptocurrency and transfer that cryptocurrency from the casino main wallet into the Player's "merchant wallet." Merchandise can be purchased from any of a set of merchants accepting that cryptocurrency, which may be exclusive to the casino. In some embodiments, the loyalty points are converted into an enterprise blockchain cryptocurrency accepted by the merchants. One or more casino brands and the merchants themselves participate in and have nodes on the enterprise blockchain, as will be described further below. In other embodiments, the loyalty points are converted into an enterprise blockchain cryptocurrency that is further converted to a public cryptocurrency when the cryptocurrency is transferred from the casino main wallet into the merchant wallet.

In accordance with one or more embodiments, to further encourage acceptance from regulatory bodies and players, when cryptocurrency is transferred from the Player's transfer wallet into the casino main wallet, it may be converted by the bridge service into a cryptocurrency that is a stablecoin. If the Player deposits stablecoin into the transfer wallet, no conversion may be necessary. Stablecoins offer many benefits that other cryptocurrencies provide, with one essential difference: they are stable. In a market where the price of the assets one holds may be changing dramatically, the option to use cryptocurrency in a way that limits volatility is an important consideration for a regulated casino.

Centralized stablecoins backed by fiat are backed 1:1 by fiat currencies, which are stored in bank accounts. In most cases, stablecoins are pegged to widely used fiat currencies such as the U.S. Dollar or the Euro. Examples include Tether (USDT), USD Coin (USDC), and Gemini USD (GUSD). Some are pegged to commodities, such as gold. They are centralized stablecoins because they are controlled by a central organization, which may be a company, a bank, or a government. Decentralized stablecoins backed by crypto do not have a central operator, but are governed by a consensus of the users who take part in the network. An example is Maker DAO's stablecoin, DAI. Users can lock up a certain amount of cryptocurrency, such as Ethers, as collateral for borrowing DAI, which is pegged to the U.S. Dollar. Decentralized algorithmic stablecoins do not have any collateral backing their system, and they rely on algorithms to get their price in order to remain stable. As each casino entity may select the types of stablecoin it prefers to use internally, any and all types of stablecoins fall within the scope of the various embodiments of the invention.

An example of a casino-preferred stablecoin might be an ERC-20 Token on the Ethereum blockchain that is pegged against a fiat currency. Players might prefer knowing that their cryptocurrency deposited with the casino (and converted to a cash equivalent in their unified wallet) is unlikely to fluctuate in value when they withdraw the cryptocurrency back out of their account. Similarly, a merchant accepting cryptocurrency from the Player's merchandise wallet might prefer that the cryptocurrency be a stablecoin. It is believed that a stablecoin used as the casino's internally held cryptocurrency would be more likely to receive regulatory approvals and be able to meet any compliance and financial auditing requirements.

In accordance with one or more alternate embodiments, the bridge service does not convert the cryptocurrency to a cash equivalent in the unified wallet and does not deposit the cryptocurrency into the casino main wallet. Rather, the cryptocurrency is placed into a crypto currency wallet that is part of the Player's unified wallet. In some embodiments, the only balance maintained by the unified wallet is a cryptocurrency balance. Cash deposited into the unified wallet is converted into the appropriate amount of the casino cryptocurrency, as are player loyalty points. The casino's cryptocurrency, in effect, becomes the unified wallet currency.

In some embodiments, the bridge service may "wrap" the cryptocurrency it stores in the Player's unified wallet. Blockchains like Bitcoin and Ethereum have different protocols and functionalities, and due to the fundamental difference in their algorithms, they cannot talk to each other. While this independence preserves individual blockchains' sovereignty and security, it also challenges the existence of an interoperable ecosystem where data and information can be easily exchanged. Where an efficient, smooth, and fast movement of funds is crucial, wrapped crypto tokens find a valid application. Wrapped crypto tokens are cryptocurrencies pegged to the value of another original cryptocurrency. The original asset is 'wrapped' into a digital vault, such as the casino main wallet, on the public blockchain. A newly minted token of corresponding value is then created on the enterprise blockchain for use with the various casino platforms, and the wrapped cryptocurrency token is stored in the Player's unified wallet.

Wrapped tokens allow non-native assets to be used on the casino blockchain. Since wrapped tokens are pegged to another asset, they necessarily need to be managed by a custodian entity, for example, the casino, which wraps and unwraps the asset. The custodian mints a token on a given platform, such as Ethereum, in an amount corresponding to the current value of the original incoming cryptocurrency. By a similar process, when the wrapped token needs to be converted back into the original asset (a coin like Ethereum or Bitcoin), the system will request the casino to release the original token from the main wallet for transfer to the Player's crypto exchange wallet and the wrapped token is destroyed. These transactions are typically controlled by smart contracts.

In accordance with one or more embodiments, the wrapped cryptocurrency may be maintained on an "enterprise blockchain" independent of the public blockchains. An enterprise blockchain is a type of permissioned blockchain that can be used to streamline business processes at scale. Corporations may believe this type suits their needs better than a public blockchain network, such as Bitcoin, because the visibility of their data can be restricted to a select group of parties. While there are different types of blockchains, they are all essentially digital records of financial transactions and data that are shared among a group of entities. They also use cryptography to make it difficult for malicious agents to manipulate the history of previous transactions. A vast majority of enterprise blockchains are "permissioned blockchains," meaning only companies involved in the enterprise blockchain have direct control over them. For instance, they can block transactions that do not comply with their rules, or if law enforcement asks them to do so. In the example embodiments, the enterprise blockchain may be controlled, for example, by a casino, a casino brand, a manufacturer of a casino's player tracking system or some combination thereof.

Some of the main characteristics of enterprise blockchains include accountability, that they are permissioned, that they are mutable and that they are scalable.

Accountability: Each node in the network—which each holds a copy of the transaction history—is known and can be held accountable for its actions. For example, often enterprise blockchains are shared by a few companies or financial entities in a cooperative format. In the example embodiments, the casino, multiple casinos within the casinos brand and merchants offering merchandise in exchange for the casino's cryptocurrency would be examples of entities each having a node on the enterprise blockchain.

Permissioned: Only users who have permission can use the blockchain. The network owner(s) can choose who is allowed to use it and who is not.

Mutable: Unlike in a public blockchain, if all entities managing the network agree, the data can be changed.

Scalability: Because enterprise blockchains are typically not as decentralized as a public blockchain, for example, Bitcoin, they can easily support more transactions at the base layer.

In some embodiments, the enterprise blockchain may not actually include a blockchain, but instead be based on a distributed ledger technology (DLT). For example, R3's Corda is a scalable, permissioned peer-to-peer (P2P) distributed ledger technology platform that enables the building of applications that foster and deliver digital trust between parties in regulated markets. For the purposes of this disclosure, the term "enterprise blockchain" includes both enterprise blockchains and such DLT implementations.

Figure 23:
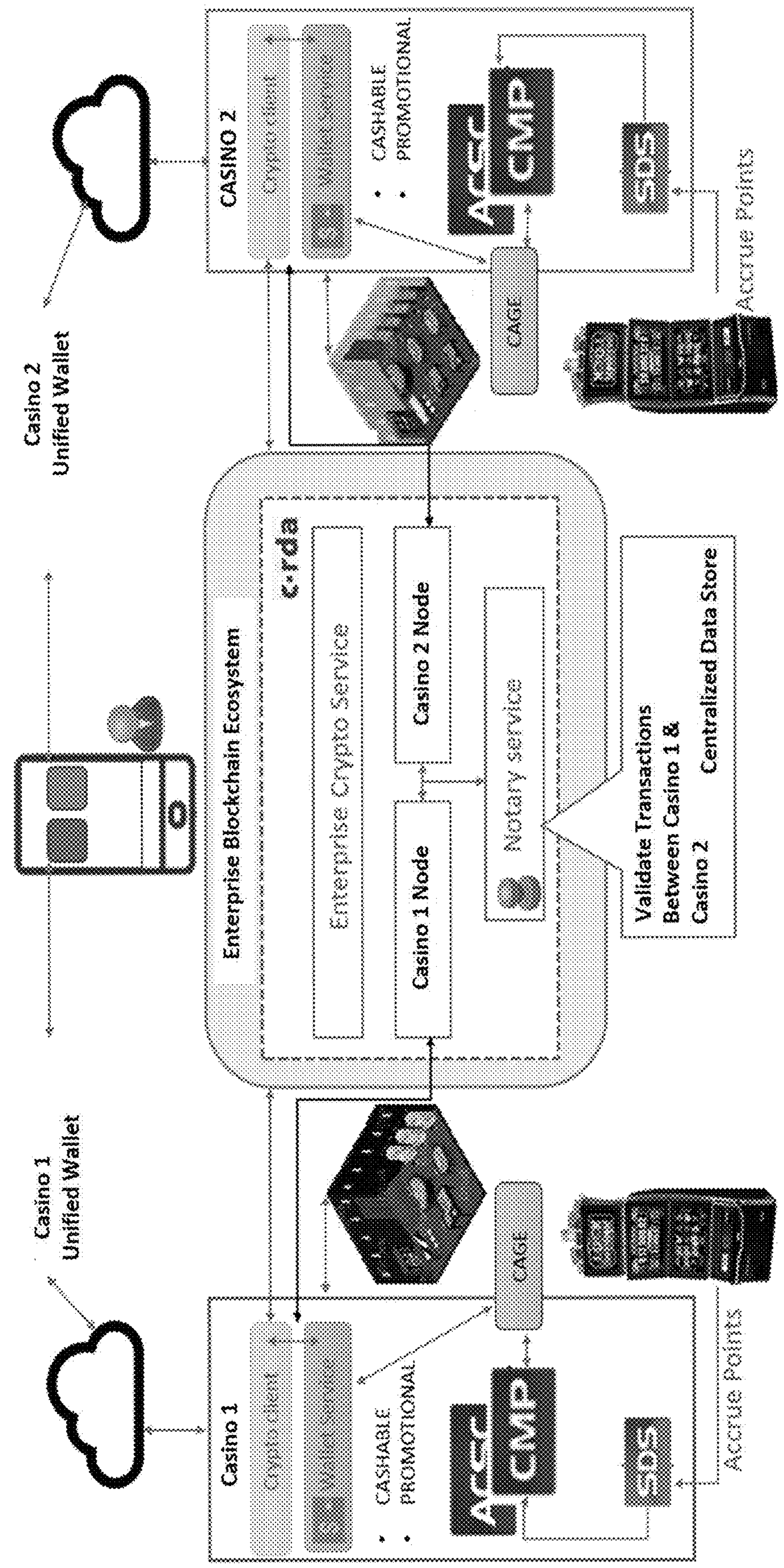
FIG. 23 illustrates an example of a centralized enterprise blockchain system shared by multiple casinos in accordance with one or more embodiments.

In accordance with one or more embodiments, as illustrated by FIG. 23, multiple casino brands may share an enterprise blockchain with a central trusted organization, such as the manufacturer of the casino gaming system or a regulatory agency, acting as the notary. In such an arrangement, the Player can move cryptocurrency from one casino's unified wallet to another without incurring the costs and delays associated with use of a public blockchain as an intermediary. For example, the Player may deposit public cryptocurrency at "Casino #1," where the bridge service bridges the public cryptocurrency into enterprise cryptocurrency by wrapping it, as described above. The Player may then travel to "Casino #2" and access the wrapped cryptocurrency for use at an EGM, as described above with reference to FIGS. 4 and 5. Further, player loyalty points accumulated via play at "Casino #1" or the "Casino #2" may be converted to wrapped cryptocurrency when the Player cards-out and then stored in the Player's respective "Casino #1" or "Casino #2" unified wallet. This "non-cashable" cryptocurrency may or may not be transferable from one casino's unified wallet to another since the points were issued for loyalty to a particular casino.

While the process of creating and managing an enterprise cryptocurrency based on an enterprise blockchain generally defeats the purpose of an open and decentralized blockchain ecosystem, a casino environment is already a regulated and trusted custodian of player funds. Great advantages are found in rapid and inexpensive processing based on a proof of authority model vs. the expensive and relatively time-consuming public proof of work model found in public blockchains. This may be especially beneficial in cases where the casino maintains all of the player unified wallet balances in the form of the casino's wrapped stablecoin. For example, the posting of accumulated player loyalty points to their unified wallets alone would create a large number of mining transactions that would be cost prohibitive if performed using the cryptocurrency in its unwrapped form on a public blockchain. With proof of authority consensus, the blockchain transactions on the enterprise blockchain blocks can be internally validated and confirmed by trusted nodes controlled by the casino or a similar trusted centralized notary.

While the example embodiments have been described with relation to a gaming environment, specifically a casino, it will also be appreciated that the above concepts can also be used in various other gaming environments. Accordingly, the disclosure should not be limited strictly to gaming casinos, but extended to arcades, portal-based game sites, and social media game sites. The EGM should be considered to be extended to include smartphone and tablet devices, personal digital assistant devices, laptops, personal computers, home game consoles, bar top gaming devices, table gaming devices, surface computing devices, television gaming, or in-room gaming devices.

One of ordinary skill in the art will appreciate that not all EGMs and gaming systems have all of these components and may have other components in addition to, or in lieu of, those components mentioned here. Furthermore, while these components are viewed and described separately, various components may be integrated into a single unit in some embodiments.

The foregoing description, for purposes of explanation, uses specific nomenclature and formula to provide a thorough understanding of the disclosure. It should be apparent to those of skill in the art that the specific details are not required in order to practice the disclosure. The embodiments have been chosen and described to best explain the principles of the disclosure and its practical application, thereby enabling others of skill in the art to utilize the disclosure, and various embodiments with various modifications as are suited to the particular use contemplated. Thus, the foregoing disclosure is not intended to be exhaustive or to limit the disclosure to the precise forms disclosed, and those of skill in the art recognize that many modifications and variations are possible in view of the above teachings.

Each of these embodiments and obvious variations thereof is contemplated as falling within the spirit and scope of the claimed invention, which is set forth in the following claims. Moreover, the present concepts expressly include any and all combinations and sub combinations of the preceding elements and aspects.

What is claimed is:

1. A method of operating a casino gaming system, the casino gaming system comprising one or more servers connected via a network, the one or more servers comprising an API service, a transfer wallet, a bridge service, a player's unified wallet and a casino main wallet, the method comprising:

via the bridge service:

detecting presence of cryptocurrency in the transfer wallet;

withdrawing the cryptocurrency from the transfer wallet;

depositing the cryptocurrency into the casino main wallet;

computing a current cash value of the cryptocurrency; and depositing credits equivalent to the current cash value into the player's unified wallet.

2. The method of claim 1 wherein the bridge service employs APIs of the API service to perform the detecting, withdrawing, computing and depositing steps.

3. A method of operating a casino gaming system, the casino gaming system comprising one or more servers connected via a network, the one or more servers comprising an API service, a transfer wallet, a bridge service, a player's unified wallet and a casino main wallet, the method comprising:

via the bridge service:

detecting presence of a first cryptocurrency in the transfer wallet;

computing a current cash value of the first cryptocurrency;

withdrawing the first cryptocurrency from the transfer wallet;

depositing the first cryptocurrency into the casino main wallet;

wrapping a second cryptocurrency equivalent to the current cash value of the first cryptocurrency;

depositing the wrapped second cryptocurrency into the player's unified wallet.

4. The method of claim 3, wherein the bridge service employs APIs of the API service to perform the detecting, withdrawing, computing and depositing steps.

5. The method of claim 3, wherein the second cryptocurrency is a stablecoin.

6. A method of operating a casino gaming system, the casino gaming system comprising one or more servers connected via a network, the one or more servers comprising an API service, a bridge service, and a player's unified wallet, the method comprising:

via the bridge service:

detecting presence of cryptocurrency in the transfer wallet;

withdrawing the cryptocurrency from the transfer wallet; and depositing the cryptocurrency into the player's unified wallet.

7. The method of claim 6, wherein the bridge service employs APIs of the API service to perform the detecting, withdrawing and depositing steps.

8. A method of operating a casino gaming system, the casino gaming system comprising one or more servers connected via a network, the one or more servers comprising an API service, a bridge service, a player's unified wallet, a casino main wallet and a player's crypto exchange wallet, the method comprising:

via the bridge service:

withdrawing credits from the player's unified wallet;

converting the withdrawn credits into cryptocurrency equivalent to the current cash value of the withdrawn credits;

depositing the cryptocurrency into the casino main wallet; and transferring the cryptocurrency to the player's crypto exchange wallet.

9. The method of claim 8, wherein the bridge service employs APIs of the API service to perform the withdrawing, converting, depositing and transferring steps.

10. A method of operating a casino gaming system, the casino gaming system comprising one or more servers connected via a network, the one or more servers comprising an API service, a bridge service, a player's unified wallet and a player's crypto exchange wallet, the method comprising:

via the bridge service:

withdrawing cryptocurrency from the player's unified wallet; and transferring the cryptocurrency to the player's crypto exchange wallet.

11. The method of claim 10, wherein the bridge service employs APIs of the API service to perform the withdrawing and transferring steps.

12. A method of operating a casino gaming system, the casino gaming system comprising one or more servers connected via a network, the one or more servers comprising an API service, a bridge service, a player's unified wallet and a player's merchant wallet, the method comprising:

via the bridge service:

withdrawing non-cashable loyalty credits from the player's unified wallet;

converting the withdrawn non-cashable credits into cryptocurrency equivalent to the current cash value of the loyalty credits and transferring the cryptocurrency to the player's merchant wallet.

13. The method of claim 12, wherein the bridge service employs APIs of the API service to perform the withdrawing, converting and transferring steps.

14. The method of claim 12, wherein the cryptocurrency in the player's merchant wallet is stored on an enterprise blockchain.

15. The method of claim 14, wherein the cryptocurrency stored on the enterprise blockchain may be redeemed for goods or services from one or more merchants.

16. A method of operating a casino gaming system, the casino gaming system comprising one or more servers connected via a network, the one or more servers comprising an enterprise blockchain service, a first unified wallet and a second unified wallet, the method comprising:

via a notary service of the enterprise blockchain service:

withdrawing a wrapped cryptocurrency from the first unified wallet; and depositing the wrapped cryptocurrency into the second unified wallet.

* * * * *